Aug. 22, 1967   Z. VIGH   3,337,278
HIGH SPEED BEARING
Filed July 13, 1964   2 Sheets-Sheet 1
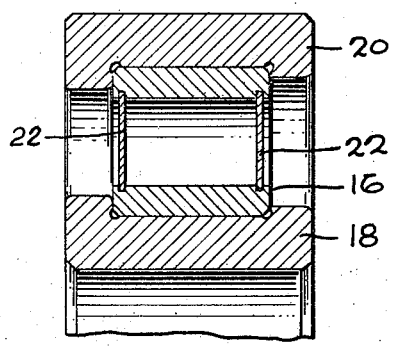
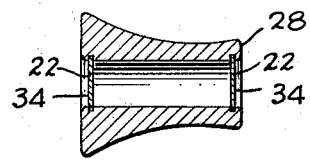
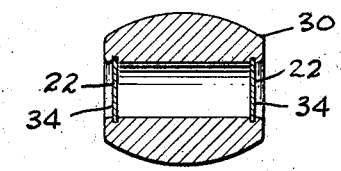
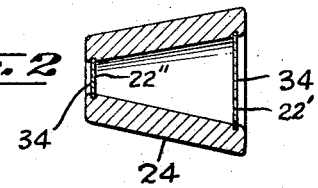
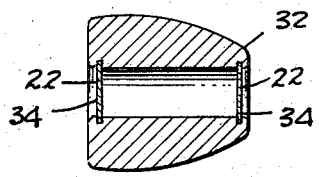
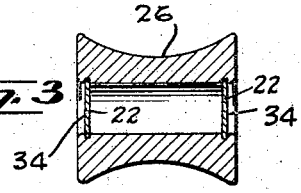
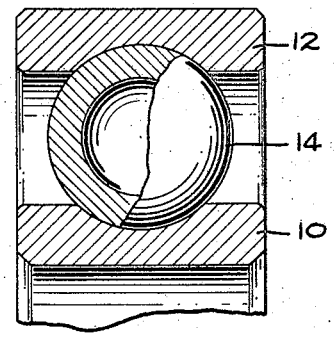
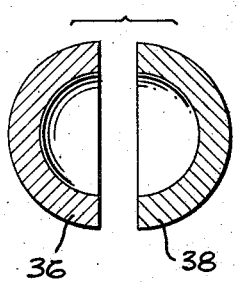
INVENTOR.
ZOLTAN VIGH
BY
Vernon D. Beehler
ATTORNEY INVENTOR.
ZOLTAN VIGH
BY
Vernon D. Beehler
ATTORNEY

United States Patent Office 3,337,278
Patented Aug. 22, 1967

3,337,278
HIGH SPEED BEARING
Zoltan Vigh, 150 E. Highland, Apt. H,
Sierra Madre, Calif. 91024
Filed July 13, 1964, Ser. No. 382,071
3 Claims. (Cl. 308—188)

This invention relates to high speed, long life bearings and more particularly to bearings having an increased life or increased speed through reduced mass of the rotating parts.

When bearings revolve at high speeds, the centrifugal force of the rotating parts of such bearings causes them to exert pressure against their outer race. This causes heat, friction, vibration and wear so that there is created drag and as a result inefficiency in operation and reduced life of the bearing. Centrifugal force is a product of mass, bearing pitch radius, and angular velocity of the square of the rotating elements. The life of a ball bearing is inversely proportional to the third power of the load or centrifugal force. By reducing this force, the life of the bearing is increased. By reducing this force, the r.p.m. of the bearing may also be increased. Since it is desired that the size of the bearing and its velocity remain unchanged, the force is reduced by reducing the mass of the rotating elements. In one embodiment this mass is reduced from the center of the rotating elements, balls or rollers.

It is therefore an object of this invention to provide a new and improved high speed bearing.

Another object is to provide a new and improved bearing capable of relatively longer life and higher r.p.m.

Another object is to provide a new and improved bearing having reduced centrifugal force.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a partial sectional view of a roller bearing showing a cylinder shaped rolling element between the inner and outer races;

FIGURE 2 is a sectional view of a tapered roller;

Figure 10:
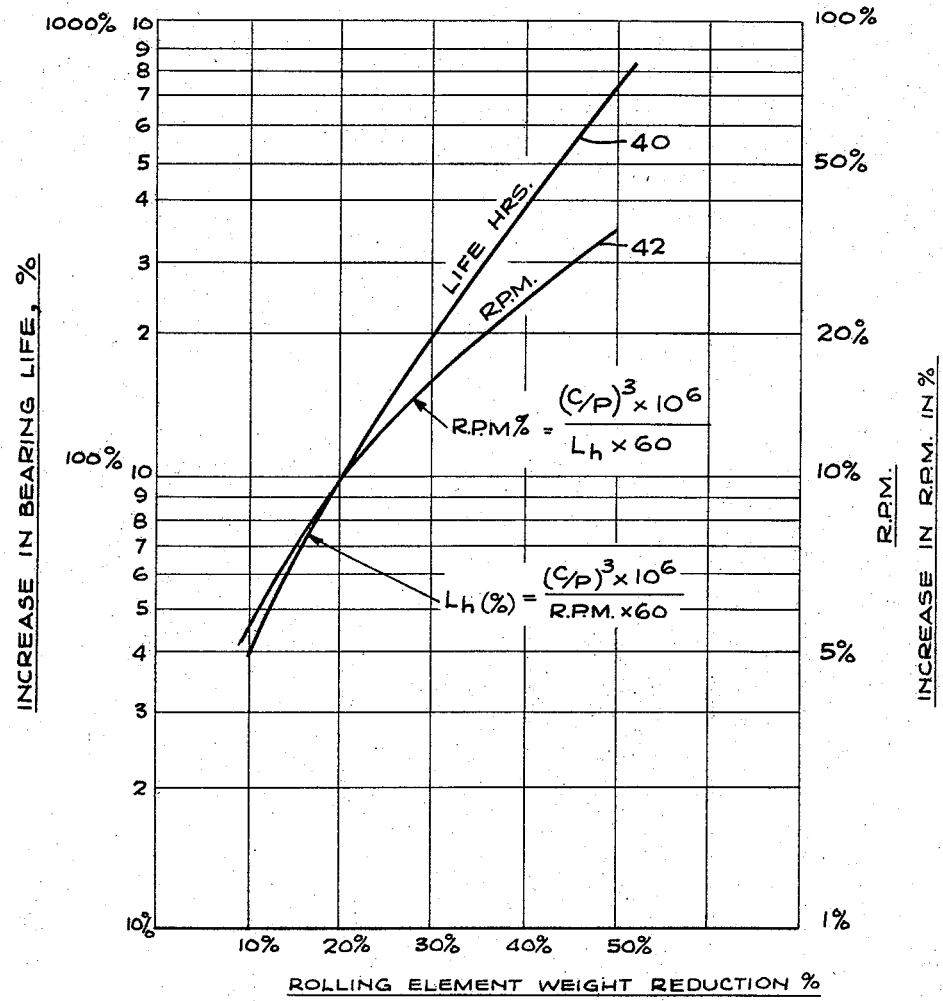
Figure 11:
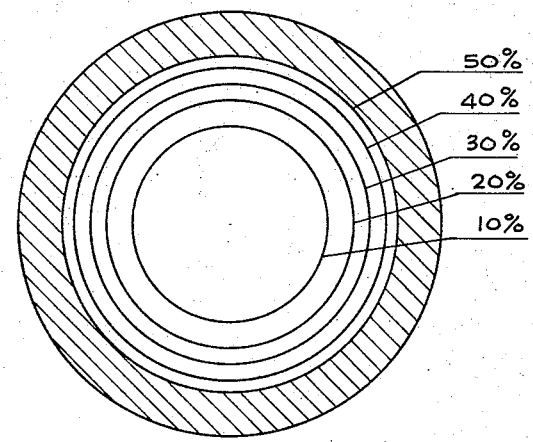

FIGURES 3, 4, 5, and 6 are sectional views of alternative roller embodiments;

FIGURE 7 is a sectional view showing ball halves before they are joined;

FIGURE 8 is a view showing the halves joined;

FIGURE 9 is a partial sectional view of a deep grooved ball bearing;

FIGURE 10 is a graph showing the relationship between weight reduction and increase in life and r.p.m.; and FIGURE 11 is a sectional view showing the relationship between weight reduction and inner space volume of a ball.

The principle feature of the present invention is the reduction of the mass of the rotating elements as a means of increasing its life or r.p.m. and without changing any of its other performance characteristics. This may be illustrated with reference to a typical bearing, such as one known in the trade as Bearing No. 7208, for example. This is a single row, angular contact ball bearing having a bore diameter of the inner ring of 40 mm. and an outer diameter of the outer ring of 80 mm. Its width is 18 mm. Each of the thirteen balls is 15/32" or 11.908 mm. diameter and weighs .01518 pound or .0069 kg. The maximum theoretical r.p.m. of the inner ring of this bearing is 37,500 r.p.m., resulting in an r.p.m. of 15,150 of the rotating balls around the shaft axis. The centrifugal force of the bearing equals the mass of the rolling element times its bearing pitch radius (distance from the center of the rolling element to the shaft axis) times the angular velocity of the rolling element squared. The angular velocity $$W = \frac{2 \Pi n \text{ (r.p.m.)}}{60} = \frac{n}{9.55} = \frac{15,150}{9.55} = 1585$$

Substituting in the formula for centrifugal force $$(CF) = \frac{G \text{ (weight)}}{g \text{ (gravity)}} r w^2 \text{ where } \frac{G}{g} = \frac{.0069 \text{ kg.}}{9810 \text{ mm/sec.}^2}$$

$r=30$ mm. and $w=1585$; $CF=53$ kg. or 116.5 lbs. per ball. Thirteen balls have a total centrifugal force of $13 \times 53$ kg.$=688$ kg.$=1515$ lbs. per bearing. Slide rule calculation give the figures used by way of explanation.

Centrifugal force is a factor in determining the life of a ball bearing in an empirical equation $$L = \frac{(c)^3}{p}$$

where $c=$dynamic capacity in pounds of a bearing. This information is furnished by the bearing manufacturer. $L=$life of bearing in millions of revolutions and $P=$load or centrifugal force. C for a No. 7208 bearing is approximately 6160 lbs. Thus $L=(6160/1515)^3=4.08^3=68$ million revolutions. At 37,500 r.p.m. this converts to approximately 30.5 hours bearing lifetime for a solid ball No. 7208 bearing.

If the balls in FIGURE 9 were solid, all the foregoing data would be applicable to it. Now, in accordance with the present invention, let there be removed some mass from the center of each ball to reduce its mass about 50%, without change of the bearing characteristics, this new lesser weight will increase the new bearing lifetime. The mass removed from the center of the ball now causes the ball to weigh .00759 lb. or .00345 kg.

$$CF = \frac{.00345}{9810} \times 30 \times 1585^2 = 26.5 \text{ kg.}$$

or 58.25 lbs., 13 balls$\times 26.5$ kg.$=344$ kg.$=757$ lbs. The centrifugal force of the ball of reduced weight is now 757 lbs. rather than the previously indicated force of 1,515 lbs. Using the formula $$L = \left(\frac{c}{p}\right)^3$$

this reduced weight provides for a lifetime of 538 million revolutions or 240 hours lifetime at 37,500 r.p.m. Compared to the lifetime of 30.5 hours for the solid ball, this bearing will last 240/30.5 times longer. Thus, by reducing the mass, the lifetime of a ball bearing may be extended up to 800%.

While the above illustration has been of a specific example of the type shown in FIGURE 9, wherein numeral 10 designates the inner ring, 12 the outer ring and 14 one of the balls, the principle of this invention may be applied to bearings of assorted configurations. For example, in FIGURE 1 is shown a cylindrical bearing roller 16 of uniform roller outer diameter, between an inner ring 18 and and an outer ring 20. Since churning of lubricating material, i.e. grease or oil, is not desirable, the ends of the bearing roller 16 are sealed with thin discs 22. FIGURE 2 shows a tapered roller 24. The configuration in FIGURE 3 is a symmetrical concave roller 26. FIGURE 4 shows a non-symmetrical concave roller 28, FIGURE 5 shows a symmetrical convex roller 30, and FIGURE 6 shows a non-symmetrical convex roller 32. Each of these show grooves 34 into which discs may be inserted to prevent churning of lubricants. In the case of FIGURES 3, 4, 5, and 6 the discs 22 are of the same size. In FIGURE 2 discs 22′ and 22″ are of different sizes. These are illustrative examples only of the many types of bearing roller elements that may use the principles of the present invention which are not limited thereto.

Reducing the mass of the rotating elements presents few, if any, problems when the rotating elements are rollers. Removing mass from solid balls, however, is more difficult. Two methods are suggested although others will readily occur to those skilled in the art.

Referring now to FIGURES 7 and 8, the ball roller elements may be forged steel half sheels, 36, 38, forged together. These balls, also, may be of steel casting made with a light weight, heat resistant material such as graphite, for example.

Referring now to the chart in FIGURE 10, there is shown the relationship between the percentage of rolling element weight reduction (over a solid ball) and the percent increase in bearing life, as indicated by the "life" line 40 curvature. For example, 50% weight reduction shows 740% life increase and 30% weight reduction shows 200% life increase. (Ordinarily the bearing lifetime calculation is based on the lifetime of the inner ring.) FIGURE 10 also shows the relationship between the increase in r.p.m. in percent and the percent of rolling element weight reduction as indicated by the "r.p.m." line 42 curvature. For example, 50% weight reduction shows 35% r.p.m. increase and 30% weight reduction shows approximately 17% increase. In another illustration a solid ball at 20,000 r.p.m. has a centrifugal force or load of approximately 430 pounds, and a ball with 50% weight reduction has a load of approximately 215 pounds. This 50% weight reduction, however, increases the life of the ball from approximately 2,500 hours to approximately 20,000 hours. Cutting the weight in half extends the life about 800%.

FIGURE 11 shows in cross-section a typical ball rolling element made in accordance with the present invention. The desired weight reduction is within a range of from 10% to 50%.

While weight reduction of up to 50% has been achieved without detrimental change of performance characteristics, it is believed that for bearings of certain types of light alloy materials, such as aluminum alloy materials, for example, even greater weight reductions of the rotating elements are possible. Lighter weight rolling elements may result from their use per se and thus reduce the centrifugal force with accompanying lifetime increase.

Although a presently preferred embodiment of the invention has been shown and described, it is to be understood that the invention is susceptible to variations in form and construction within the scope of the appended claims.

Having described the invention what is claimed as new in support of Letters Patent is:

1. A high speed long life bearing having reduced centrifugal force at a selected r.p.m., said bearing comprising an inner ring and an outer ring, a plurality of roller elements positioned between races and in contact therewith, said roller elements having internal areas of reduced weight thereby to reduce the total weight of the respective roller elements, said internal areas of said roller elements being filled with a relatively lighter weight yieldable material, and means acting between each respective roller element and the material of lighter weight inhibiting change in status of said material of lighter weight during operation.

2. A high speed long life bearing having reduced centrifugal force at a selected r.p.m., said bearing comprising an inner ring and an outer ring, a plurality of roller elements adapted to contact and roll between said rings, said rolling elements being hollow along the respective axes of rotation to reduce the weight and thereby selectively increase the life and r.p.m. thereof and snap discs at the respective ends of said roller elements in sealing engagement with the roller elements to prevent entrance of lubricants therein.

3. A high speed long life bearing having reduced centrifugal force at a selected r.p.m., said bearing comprising a roller element having an external bearing surface, said bearing having a hollow interior along the axis of rotation to reduce the weight and thereby increase the life and r.p.m. thereof, and means adjacent opposite ends of said hollow interior sealing said ends to prevent entrance of material into said hollow interior.

References Cited

UNITED STATES PATENTS

| 2,631,904 | 3/1953 | Frenkel | 308—215 |
| 3,144,710 | 8/1964 | Hollander et al. | 29—148.4 |

FOREIGN PATENTS

| 683,304 | 11/1952 | Great Britain. |
| 31,853 | 2/1921 | Norway. |

EDGAR W. GEOGHEGAN, *Primary Examiner.*

FRANK SUSKO, MARTIN P. SCHWADRON,
*Examiners.*